United States Patent [19]

Carpiac

[11] Patent Number: 4,470,999
[45] Date of Patent: Sep. 11, 1984

[54] HIGH SPEED, HIGH VOLUME COFFEE MAKING APPARATUS AND METHOD

[76] Inventor: Joseph L. Carpiac, 10521 Vinedale St., Sun Valley, Calif. 91352

[21] Appl. No.: 379,952

[22] Filed: May 19, 1982

Related U.S. Application Data

[63] Continuation-in-part of Ser. No. 344,395, Feb. 1, 1982.

[51] Int. Cl.³ .................... A47J 31/00; A47J 31/40
[52] U.S. Cl. .................................. 426/506; 99/275; 99/323.3; 141/1
[58] Field of Search ................ 141/275, 1, 4, 5–8, 141/13, 18, 37, 39, 48–54, 59; 99/275, 279–282, 300, 323, 323.3; 426/432, 433, 594–596, 506; 122/31 R

[56] References Cited

U.S. PATENT DOCUMENTS

| | | | |
|---|---|---|---|
| 3,336,013 | 8/1967 | Salo | 122/31 |
| 3,532,505 | 10/1970 | Cornelius | 99/282 |
| 4,287,817 | 9/1981 | Moscowitz et al. | 99/282 |

Primary Examiner—James E. Bryant, III
Attorney, Agent, or Firm—Wagner & Bachand

[57] ABSTRACT

Apparatus and method for the high speed, high volume making of coffee by preheating then superheating water, mixing with a liquid coffee concentrate and balancing heat demands throughout the apparatus to enable preheating of the receiving urn, storing of heat as steam beyond the boiler, and return of that steam to the boiler responsive to pressure drop caused by differential flow rates into and from the boiler, to enable rapid recovery of the boiler and rapid making of large quantities of coffee.

20 Claims, 4 Drawing Figures

HIGH SPEED, HIGH VOLUME COFFEE MAKING APPARATUS AND METHOD

REFERENCE TO RELATED APPLICATION

This application is a continuation in part of my copending application entitled "High Speed, High Volume Coffee Making Apparatus", Ser. No. 06/344,395, filed Feb. 1, 1982, the disclosure of which is hereby incorporated herein by reference.

TECHNICAL FIELD

This invention has to do with coffee making apparatus, and more particularly with coffee making apparatus which produces high volumes of fresh coffee at high speed, such as is useful in banquet operations, large restaurants, hospitals, institutions, sports event catering and the like. Importantly, the present invention apparatus and method overcome the chief problem in high volume production of coffee, that is the previous inability of the art to generate, regenerate and maintain the necessary volumes of superhot water needed in any practical size apparatus.

BACKGROUND ART

Historically, coffee has been brewed by passing very hot water in contact with finely ground coffee beans. Variations on this approach include use of brief hot water contact to elute only the more soluble portion of the coffee, so-called espresso, long contact between coffee and water to remove all soluble portions from the bean, so-called turkish coffee, and all manner of variants in-between. Freeze-dried coffee has also been used. The problem has been to retain fresh-brewed taste while making high volumes of the beverage; freeze-dry coffee concentrates do not retain sufficient of the delicate components of the coffee to taste like freshly brewed coffee when prepared in bulk. The alternative, normal percolation is often too slow.

The development of liquid coffee concentrates makes possible more rapid brewing of coffee by simple mixing of the concentrate and the heated water, a coffee-making process which takes no longer than than the step of mixing. Attention now turns to the heated water supply as the limiting factor in production. It is known to preheat water and release it into a liquid concentrate, but coffee quantities beyond the capacity of the water heating tank have been difficult to get rapidly owing to the long cycle involved in heating a second tank of water. Assuming a reasonable size hot water tank, the apparatus does not have enough capacity for the institutional needs mentioned above.

DESCRIPTION OF THE INVENTION

It is therefore an object of the invention to provide apparatus for the making of coffee at high volumes, and quite rapidly initially and successively, while retaining the organoleptic qualities of brewed from the grind coffee. It is another object to provide apparatus adapted to use liquid coffee concentrate and superheated water to effect rapid coffee making. It is still another object to provide metering or proportioning mixing whereby the liquid concentrate and the water are self mixing at high speeds and self proportioning for reproducible coffee making results. It is a further object to balance heat requirements during the process to enable rapid recovery of the apparatus for a further cycle. It is a highly specific object to deliver superheated water to the coffee urn receptacle at high flow rates above the refill flow rate to the water heating tank, and to block the development of vaccum in the tank and consequent false pressures inhibiting rapid water reheating, by supply or resupply of steam to the tank responsive to differential flow rate vacuum generation, the tank itself acting as a source of steam supply in some embodiments.

These and other objects of the invention to become apparent hereinafter are realized in high speed, high volume coffee making apparatus for restaurants institutions, and the like, according to the invention, comprising a water tank adapted to continually superheat water, the tank having an inlet communicating the tank with a relatively colder water supply, and an outlet communicating the superheated water in the tank with a coffee urn, means including a liquid coffee concentrate supply for mixing superheated water from the tank with coffee concentrate and passing to the coffee urn in a predetermined ratio productive of potable coffee, means continually refilling the tank from the colder water supply in timed relation with tank water passing to the coffee urn, and means blocking development of a partial vacuum within the tank before refilling is achieved.

It is preferred that the vacuum development blocking means comprise means passing steam into the tank in timed relation with tank refilling in a manner offsetting liquid volume changes within the tank.

In particular embodiments of the invention there is further included means preheating the liquid coffee concentrate in advance of mixing with the tank water; means preheating the water in the relatively colder water supply in advance of the tank inlet to an elevated temperature below the tank water temperature; water pump means for moving superheated water from the tank; piping carrying the liquid coffee concentrate and the tank water toward the urn, and pump means controlling the relative volumes of concentrate and tank water in the piping.

Additionally, the apparatus includes the steam passing means comprising a steam supply beyond the tank and means selectively communicating the tank interior with the steam supply, e.g. the tank may define a pressurized steam-filled headspace above the superheated tank water, and there may be included also means delivering tank headspace steam to the urn in timed relation before passing of tank superheated water to the urn to preheat the urn for the water. Further contemplated in the apparatus is means storing tank headspace steam beyond the tank for return passing to the tank in timed relation with tank refilling to block vacuum development within the tank, having the urn define the steam storing means, and the steam passing means communicating the tank and the urn for storage and return in sequence of the tank headspace steam.

In particularly preferred embodiments, the present high speed, high volume coffee making apparatus comprises a tank defining an enclosed supply of superheated water, means periodically delivering a portion of the supply at a relatively rapid rate to a coffee urn in liquid coffee concentrate mixing relation, means regenerating the enclosed superheated water supply by delivery of colder water thereto at a relatively slower rate, and means adding steam to the enclosed supply responsive to flow rate differential development of vacuum in the enclosed supply. In these embodiments as in previous embodiments, there is further included means preheating the liquid coffee concentrate in advance of mixing with the tank water; means preheating the relatively colder water in advance of delivery to the enclosed water supply tank, and to an elevated temperature below the supply water temperature; water pump means for moving superheated water from the enclosed supply; piping carrying the liquid coffee concentrate and piping carrying the superheated water toward the urn, pump means controlling the respective volumes of concentrate and supply water in the piping, and means connecting the piping in advance of the urn adapted for mixing the concentrate and the supply water into potable coffee; the steam adding means comprising a steam supply beyong the tank and means selectively communicating the tank enclosed water supply with the steam supply comprising first conduit leading from the tank to the urn, and second conduit returning to the tank from the urn, the return conduit having a valve and a valve controller opening the valve responsive to vacuum development within the tank; a pressurized steam-filled headspace within the tank above the superheated water adapted to feed the steam supply beyond the tank; the first conduit being adapted for delivering supply headspace steam to the urn in timed relation before passing of supply water to the urn, whereby the urn is preheated for coffee receiving; the urn defining the steam supply beyond the tank, and the valve controller being adapted to permit steam return from the urn to the tank responsive to vacuum development in the tank resultant from flow rate differentials between refill water and passage of tank water to the urn.

The invention further contemplates the method for the high speed, high volume making of coffee for restaurants, institutions and the like, including maintaining an enclosed supply of superheated water, periodically delivering a supply portion at a relatively rapid rate to a coffee urn in liquid coffee concentrate mixing relation, regenerating the enclosed superheated water supply by colder water delivery thereto at a relatively slower rate, and adding steam to the enclosed supply responsive to incipient vacuum development therewithin in response to the differential between the flow rates.

DRAWINGS

The invention will be further described as to an illustrative embodiment in conjunction with the attached drawings in which.

PREFERRED MODES

Figure 1:
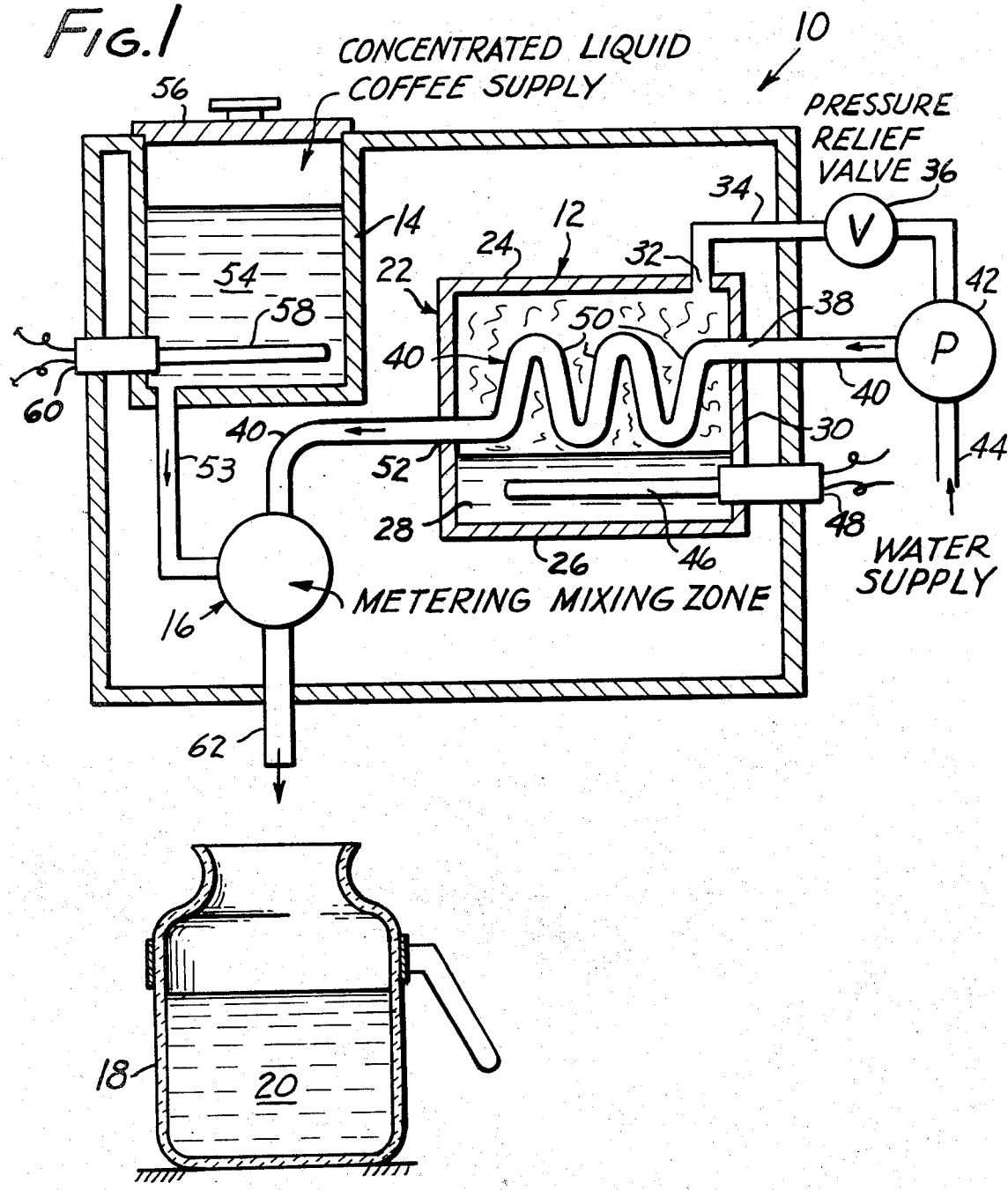
FIG. 1 is a vertical section view of a first embodiment of the present apparatus, and partly schematic.

Turning now the drawings in detail, the first embodiment of the apparatus is shown in FIG. 1, and generally comprises a housing 10 of sheet metal which encloses a steam chamber 12, a liquid coffee concentrate container 14, and a mixing and proportioning valve 16. Receptacle 18 is positioned below the housing 10 to receive the output of coffee 20.

The steam chamber 12 comprises a sheet metal tank 22 having top, bottom, end and side walls 24, 26, 28 and 30 respectively. Top wall 24 is provided with a relief valve port 32, piping 34 and relief valve 36 to relieve excessive steam pressure within the chamber as necessary. Side wall 30 is ported at 38 to pass tubing 40 into the chamber 12. Tubing 40 is filled with water pressurized to above about 60 pounds by pump 42 from source 44. The pump can be a solenoid type, or a displacement pump.

The pressurized water in tubing 40 is carried on a closed path within the chamber 12 defined by the tubing configuration. Typically the tubing 40 configuration is helical as shown, but it can be any specific form provided the purposes of the invention are met, i.e. with the water in the chamber heated to superheated condition, e.g. above about 220° F. to 250° F. and preferably to about 230° F., the water in the tubing can emerge from the steam chamber at between 180°-190° F. after traversing the elongated path in the steam chamber 12.

Thus, the path defined by the tubing must be long enough, given the incoming water temperature and the volume of water, that the dwell time within the chamber 12 is sufficient to properly heat the water. The satisfactory dwell time is further a function of the temperatures within the chamber 12. Accordingly, a heating element 46, suitably connected to an electricity supply at 48 is immersed in the water added to chamber 12, whereby the water is heated above boiling temperature, e.g. 230° F. as mentioned, and kept there by the closed chamber pressure upon sufficient heating of the chamber water by the element 46. Typically, the tubing 40, in whatever configuration, helix, spiral, reverse fold, sawtooth, or wall-lining is elongated relative to the axial length of the chamber to provide more steam exposure time than would be obtained by a straight-through pipe. The tubing 40 heat transfer sections, e.g. helices 50 as shown are passed through the steam-filled portion of the chamber for maximum heat transfer rates. Copper is a good tubing 40 material.

The now heated water emerges from the steam chamber 12 at 52 and is passed, still in tubing 40 to the mixing and proportioning valve 16.

Also at valve 16, in tubing 53, is liquid coffee concentrate 54 which is passed thereby from container 14, defining the concentrate supply, and suitably preheated to about 140°, and more broadly to between 100° and 150° F., more or less. Replenishing of the coffee concentrate supply is through the top of container 14 by removal of top 56. The concentrate is heated by heating element 58 connected to electrical power at 60. The concentrate 54 is drawn from the container 14 by gravity or by the partial vacuum created at the valve 16 by the flow of pressurized heated water there. Thus, a simple "T" type mixer can be used with the head of the "T" defined by the tubing 40, and the leg of the "T" by the tubing 53. Alternatively, a proportioning valve such as sold by Circle Seal Controls can be used. In either case, the two liquids are merged through passage from their respective tubing through inlet orifices (not shown) which are relatively sized fixedly or adjustably, to meter the liquids at different rates into a common outlet tube 62, and in a turbulent, mixing fashion, normally associated with a Venturi mixer for delivery as intermixed, correctly proportioned components of coffee.

Figure 2:
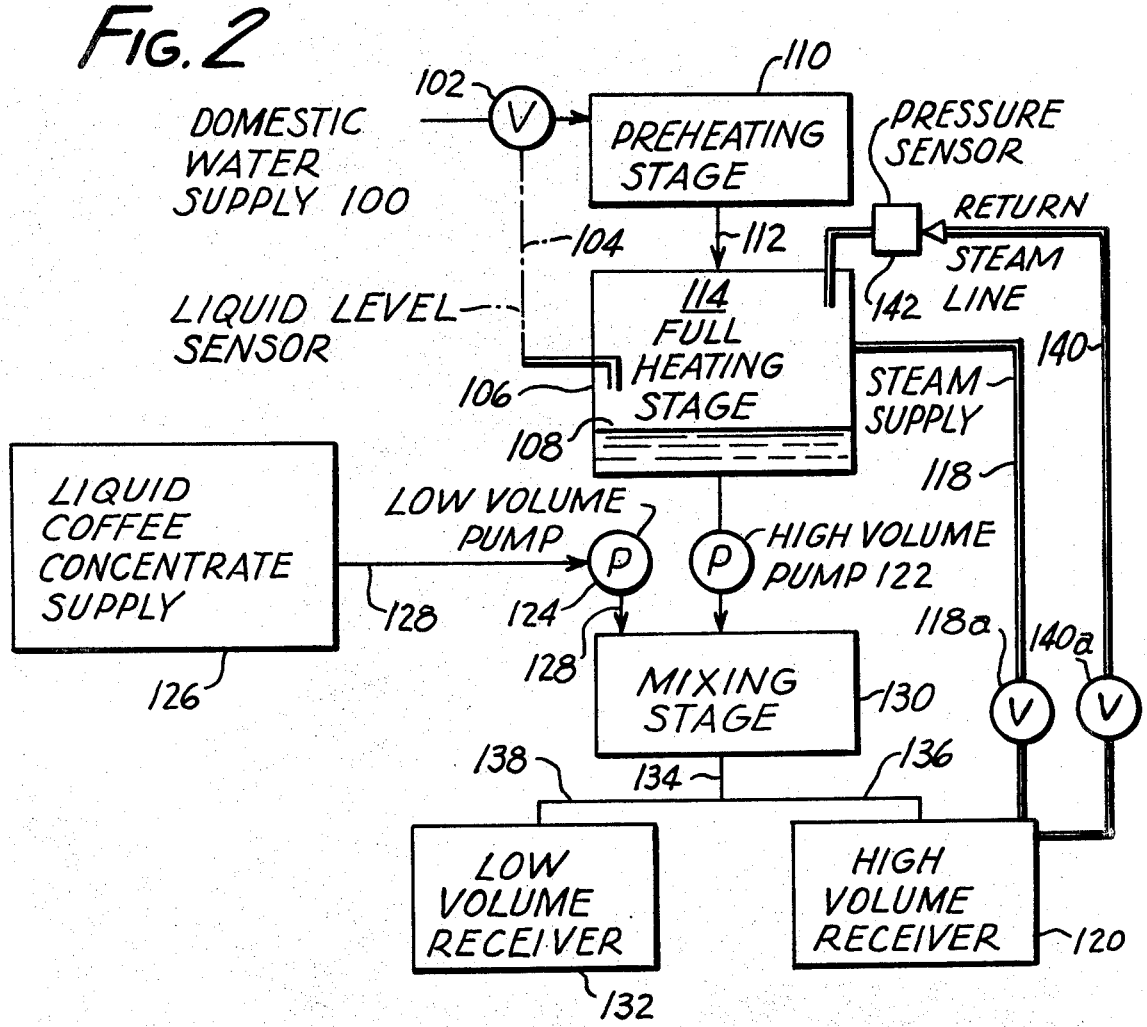
FIG. 2 is a schematic representation of a second embodiment of the apparatus.
Figure 3:
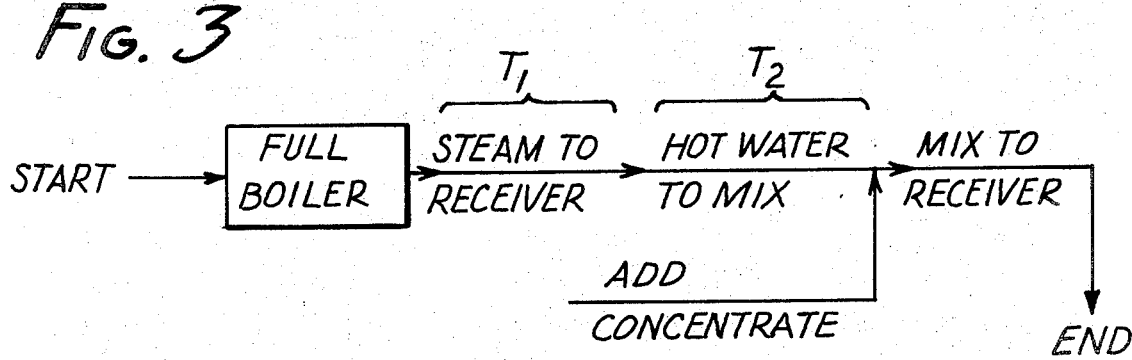
FIG. 3 is a schematic representation of the cycle of operations in the second embodiment shown in FIG. 2; and, FIG. 4 is a further, detailed schematic of the second embodiment of the apparatus.
Figure 4:
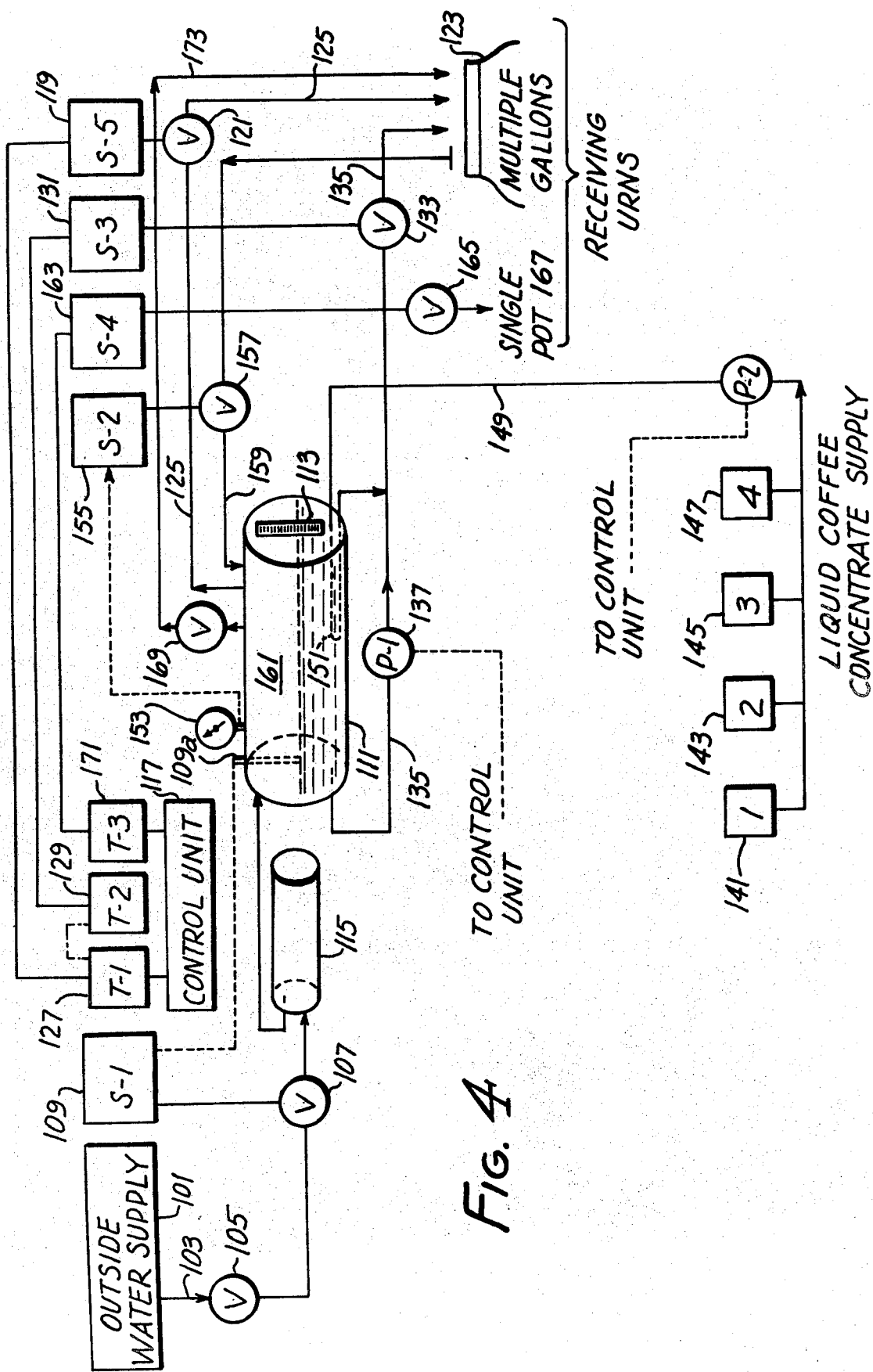

In the second embodiment of the invention, greater recovery capabilities are obtained, enabling virtually continual high speed coffee production. With reference now to FIGS. 2, 3 and 4, the second embodiment utilizes tap water which can be from the institution hot water heating system, labeled Domestic Water Supply at 100 in FIG. 2, or other Outside (the apparatus) Water Supply as indicated at 101 in FIG. 4.

In FIG. 2, the supply water passes through valve 102 which can be used to limit pressure, and/or act to cut off the apparatus in the event of insufficient line pressure or volume. The valve 102 is indirectly coupled to a liquid level sensor depicted as line 104 which senses the water level in tank 106 (to be described) and opens or closes the valve accordingly to admit or exclude water and to keep the tank 106 filled to the desired level, e.g. 108. Supplied water passing valve 102 enters a preheating stage 110 where an immersion heater takes the water temperature to an elevated temperature below the temperature in tank 106. The water is then passed to tank 106 along line 112. In tank 106 another and larger immersion heater, e.g. of 5000 watts is used take the water temperature above 212° F. This temperature rise while not instantaneous is quite rapid given the tank water content of about 7 gallons. The tank 106 is dimensioned such that there is a headspace at 114 above the water level 108. Since the tank 106 defines an enclosure, the water therein becomes superheated, reaching temperatures of 220° to 230° F., with the generation of steam in the headspace 114 at low pressures of about 10 psi. over one atmosphere. This pressurized steam is used in the second embodiment of the invention as will be described. With particular reference to FIGS. 2 and 3, the coffee making cycle is initiated when the tank 106 water is at temperature by opening valve 118a for a time such as 15 seconds as determined by Timer T1, FIG. 3. Steam thus is passed along line 118 from the headspace 114 to the receiving urn 120, an insulated bottle capable of holding 5 gallons of coffee and labeled High Volume Receiver. The steam thus delivered is passed into the urn 120, prewarming the urn, and creating there a stored quantity of steam beyond the tank 106, which is highly important as will be seen. Timing out of Timer T1 activates Timer T2, see FIG. 3, starting pump 122, a high volume pump which rapidly empties the tank 106 of the superheated water necessary to fill receiving urn 120. Simultaneously, pump 124 is turned on, delivering liquid coffee concentrate from a supply 126 along line 128 to a mixing stage 130. Mixing stage 130 can take the form of a T intersection of piping, a mixing valve or other apparatus capable of combining two liquid streams. Proportioning of the streams is readily accomplished by the differential flow rates in pump 122, high volume, and pump 124, low volume, but piping constrictions, valving and other expedients can be used. In general from 6 to 8 volumes of water is combined with each volume of concentrate. As it is mixed, the concentrate and superheated water is passed from the mixing stage 130 to the receiving urn 120 along lines 134, 136. If desired, a quantity of the mixture in mixing stage 130 can be passed along line 138 to a single pot of coffee indicated as the low volume receiving 132. If only the low volume pot 132 is to be filled the drain on the tank 106 is slight enough that the steam return feature now to be described is not required.

In order to rapidly produce the five gallons of coffee in urn 120, the pump 122 empties the tank 106 at up to 10 gallons per minute. The make-up water from the supply 100 via preheating stage 110 and line 112 is available at about 1 gallon per minute. The result is the development of a partial vacuum in the tank 106 as more water leaves than enters. The entering water is colder of course than the exiting water. These conditions have been found to make difficult the rapid recovery of superheated water in tank 106. In the absence of corrective action, the coffee making cycle is greatly extended since the tank 106 takes a relatively longer time to superheat the water therein. In the second embodiment of the invention, use is made of steam from beyond the tank 106, which can be the steam initially sent out from the tank headspace 114, or some other source of steam. It is preferred to use the steam sent to urn 120 at the start of the cycle. For this purpose a steam return line 140 leads from receiving urn 120 back to tank 106. Valve 140a controls the line 140. A pressure sensor 142 controls valve 140a, opening the valve when an incipient drop in pressure is sensed in the tank 106, and enabling steam in and around the urn 120 to flow back into the tank, increasing the volume of steam there and adding heat as the new water is admitted simultaneously by operation of valve 102, which will have been opened upon a lowering of the water level in the tank 106 as described.

With reference to FIG. 4, the second embodiment is shown in more detail. The water supply 101 at about 140° F. passes water along line 103 through valve 105 which protects against overpressures and underpressures, thence through valve 107 which is a water level sensitive valve opening responsive to a signal from switch S-1, indicated at 109, which in turn is coupled electrically to a sensor 109a for the tank 111 to sense the water level and add water when the level is too low. Water level is externally visible on gauge 113 attached to the tank 111. Water passing valve 107 enters preheater 115, a cylinder containing a high wattage heating element suited to preheating the water to about 175° F. for delivery to tank 111, the water typically enters the preheater 115 at one end traverses the length of the preheater and returns, in contact with the heating element (not shown). Thence the water passes directly into tank 111, which as above noted contains a high wattage heating element (not shown).

Coffee making is initiated by actuating the control unit indicated at 117 to start Timer T1 indicated at 127. Timer T1 actuates switch S-5, indicated at 119, which controls valve 121. Valve 121 opens and pressurized steam from tank 111 enters the receiving urn 123 via line 125. Timer T1 then actuates Timer T2, numeral 129 in the drawing. Timer T2 actuates switch S-3, numeral 131 in the drawing. Switch S-3 in turn controls pump P-1, at 137 in the drawing, and valve 133 which lies across line 135 from the tank 111 to the receiving urn 123. Thus after steam is introduced into the urn 123, superheated water from line 135 is passed to the urn, now steam preheated. The tank 111 water is pumped by high speed pump P-1. When the five gallons of coffee making water, less the volume of concentrate to be added, has been pumped the pump P-1 is shut down.

Simultaneous with the operation of pump P-1, pump P-2, shown at 139 in the drawing, is activated, by the control unit 117, delivering coffee concentrate from one or more of multiple supply bags 141, 143, 145 or 147. The differential volumes delivered by the concentrate and water pumps have been discussed above. The concentrate is passed along line 149 to and through the superheated water in tank 111, for the purpose of preheating the concentrate for mixing with the superheated water, using loop 151 in line 149.

As the water level in tank 111 drops, the tank pressure drops, and is registered on scale 153. The tank steam pressure is sensed by switch S-2, shown at 155 in the drawing. Valve 157, controlled by switch S-2, is opened responsive to sensing of the reduced tank 111 pressure opening line 159 communicating the receiving urn 123 and the headspace 161 in tank 111. The returning steam ameliorates the pressure drop enabling rapid recovery of superheated water supply in tank 111.

If desired, a single pot may be made by actuating the single pot switch S-4, shown at 163 in the drawing, through the control unit, opening the valve 165 for a period determined by Timer T3, shown at 171, and enabling water in line 135 to pass to the pot 167.

Provision is also made for relieving excess pressure within the tank 111 through a conventional relief valve 169, any steam thus released being channeled to the receiving urns 123, 167 as shown, through line 173.

The proportions of concentrate and water mentioned are not narrowly limited, and in all cases will be dependent on the proper dilution factor for the concentrate being used. Presently commercially available liquid coffee concentrates are suitably diluted seven times, i.e. in a ratio of 7, but multiple dilutions of 6 and 8 can be used, and other concentrates may require different dilution ratios.

The present apparatus delivers surprisingly high volumes of coffee, e.g. 5 gallons per minute are easily realized, and the taste is indistinguishable from brewed from the grind type coffee.

I claim:

1. High speed, high volume coffee making apparatus for restaurants, institutions, and the like, comprising a water tank adapted to continually superheat water, said tank having an inlet communicating said tank with a relatively colder water supply, and an outlet communicating the superheated water in said tank with a coffee urn, means including a liquid coffee concentrate supply for mixing superheated water from said tank with coffee concentrate and passing to said coffee urn in a predetermined ratio productive of potable coffee, means continually refilling said tank from said colder water supply in timed relation with tank water passing to said coffee urn, and means blocking development of a partial vacuum within said tank before refilling is achieved, said vacuum development blocking means comprising means passing steam into said tank in timed relation with tank refilling in a manner offsetting liquid volume changes within said tank.

2. The high speed, high volume coffee making apparatus according to claim 1, including also means preheating said liquid coffee concentrate in advance of mixing with said tank water.

3. The high speed, high volume coffee making apparatus according to claim 1, including also means preheating the water in said relatively colder water supply in advance of said tank inlet to an elevated temperature below said tank water temperature.

4. The high speed, high volume coffee making apparatus according to claim 1, including also water pump means for moving superheated water from said tank.

5. The high speed, high volume coffee making apparatus according to claim 1, including also piping carrying said liquid coffee concentrate and said tank water toward said urn, and pump means controlling the relative volumes of concentrate and tank water in said piping.

6. The high speed, high volume coffee making apparatus according to claim 1, in which said steam passing means comprises a steam supply beyond said tank and means selectively communicating said tank interior with said steam supply.

7. The high speed, high volume coffee making apparatus according to claim 6, in which said tank defines a pressurized steam-filled headspace above said superheated tank water.

8. The high speed, high volume coffee making apparatus according to claim 7, including also means delivering tank headspace steam to said urn in timed relation before passing of tank superheated water to said urn to preheat said urn for said water.

9. The high speed, high volume coffee making apparatus according to claim 8, including also means storing tank headspace steam beyond said tank for return passing to said tank in timed relation with tank refilling to block vacuum development within said tank.

10. The high speed, high volume coffee making apparatus according to claim 9, in which said urn defines said steam storing means, and in which said steam passing means communicates said tank and said urn for storage and return in sequence of said tank headspace steam.

11. High speed, high volume coffee making apparatus for restaurants, institutions and the like, comprising a tank defining an enclosed supply of superheated water, means periodically delivering a portion of said supply at a relatively rapid rate to a coffee urn in liquid coffee concentrate mixing relation, means regenerating said enclosed superheated water supply by delivery of colder water thereto at a relatively slower rate, and means adding steam to said enclosed supply responsive to flow rate differential development of vacuum in said enclosed supply.

12. The high speed, high volume coffee making apparatus according to claim 11, including also means preheating said liquid coffee concentrate in advance of mixing with said tank water.

13. The high speed, high volume coffee making apparatus according to claim 12, including also means preheating said relatively colder water in advance of delivery to said enclosed water supply tank, and to an elevated temperature below said supply water temperature.

14. The high speed, high volume coffee making apparatus according to claim 13, including also water pump means for moving superheated water from said enclosed supply.

15. The high speed, high volume coffee making apparatus according to claim 14, including also piping carrying said liquid coffee concentrate and piping carrying said superheated water toward said urn, pump means controlling the respective volumes of concentrate and supply water in said piping, and means connecting said piping in advance of said urn adapted for mixing said concentrate and said supply water into potable coffee.

16. The high speed, high volume coffee making apparatus according to claim 15, in which said steam adding means comprises a steam supply beyond said tank and means selectively communicating said tank enclosed water supply with said steam supply comprising first conduit leading from said tank to said urn, and second conduit returning to said tank from said urn, said return conduit having a valve and a valve controller opening said valve responsive to vacuum development within said tank.

17. The high speed, high volume coffee making apparatus according to claim 16, including also a pressurized steam-filled headspace within said tank above said superheated water adapted to feed said steam supply beyond said tank.

18. The high speed, high volume coffee making apparatus according to claim 17, in which said first conduit is adapted for delivering supply headspace steam to said urn in timed relation before passing of supply water to said urn, whereby said urn is preheated for coffee receiving.

19. The high speed, high volume coffee making apparatus according to claim 18, in which said urn defines said steam supply beyond said tank, and said valve controller is adapted to permit steam return from said urn to said tank responsive to vacuum development in said tank resultant from flow rate differentials between refill water and passage of tank water to said urn.

20. Method for the high speed, high volume making of coffee for restaurants, institutions and the like, including maintaining an enclosed supply of superheated water, periodically delivering a supply portion at a relatively rapid rate to a coffee urn in liquid coffee concentrate mixing relation, regenerating said enclosed superheated water supply by colder water delivery thereto at a relatively slower rate, and adding steam to said enclosed supply responsive to incipient vacuum development therewithin in response to the differential between said flow rates.

* * * * *